Patented Dec. 28, 1943

2,337,802

UNITED STATES PATENT OFFICE 2,337,802

VULCANIZATION OF RUBBER

Russell T. Dean, Stamford, Conn., assignor to American Cyanamid Company, New York, N. Y., a corporation of Maine No Drawing. Application December 31, 1941, Serial No. 425,236

17 Claims. (Cl. 260—793)

This invention relates to the vulcanization of rubber and more particularly to a method of accelerating the vulcanization by the use of compounds constituting a new class of accelerators.

The vulcanization accelerators of the invention are dithiocarbamates characterized by the presence of substituent ether groups on alkyl radicals attached to the nitrogen atom of the dithiocarbamic acid molecule. The compounds may be represented by the formula

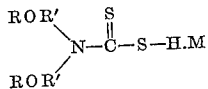

where R may be an alkyl, aralkyl or aryl group which may be the same or different. The alkyl group may be acyclic or cyclic. These radicals may contain substituents which do not change the essential character of the compound such as halogen atoms, nitro groups, hydroxy groups, etc. R' is an alkylene group which separates the oxygen atom from the nitrogen atom by at least two carbon atoms. This group may contain substituents of the kind described above in respect to the groups represented by R as well as aryl and substituted aryl radicals. R' may represent like or unlike alkylene radicals. M is an organic nitrogen base which may be a primary, secondary or tertiary alkyl, aralkyl, aryl or heterocyclic amine or a heterocyclic nitrogen base.

The dithiocarbamic acid derivatives constituting the vulcanization accelerators of the invention may be prepared by methods known to the art for the preparation of similar derivatives of similar dithiocarbamic acids. The various dithiocarbamic acids may be prepared in the form of their sodium salts by reaction of carbon disulfide, a secondary amine, and sodium hydroxide, in the presence of a suitable solvent. The resulting sodium salt in solution in the solvent is then subjected to a double decomposition reaction by adding thereto a salt of the desired organic nitrogen base (e. g. the hydrochloride). As will be understood by those skilled in the art, the solvent should preferably be so selected that it is a solvent for only one of the reaction products, thus providing for selective separation of the same. The addition is accompanied with good stirring of the reaction mixture. The insoluble sodium salt, e. g., sodium chloride, is filtered off and the filtrate containing the desired organic nitrogen base salt of the dithiocarbamic acid is concentrated under reduced pressure and dried in vacuo.

The secondary amines which may be employed for the preparation of the dithiocarbamates have the formula

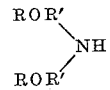

wherein R and R' are as in the above described general formula. Among the secondary amines may be mentioned, for example, Bis (2-methoxy ethyl) amine
Bis (2-ethoxy n-butyl) amine
Bis (2-ethoxy n-amyl) amine
Bis (2-ethoxy n-hexyl) amine
Bis (2-ethoxy 3-methylamyl) amine
Bis (2-ethoxy 2-benzylethyl) amine
Bis (2-ethoxy 2-phenylethyl) amine
Bis (2-($\beta$-naphthoxy) ethyl) amine
Bis (2-p-methylphenoxy ethyl) amine
Bis (3-methoxy n-propyl) amine
Bis (3-ethoxy n-propyl) amine
Bis (3-isopropoxy n-propyl) amine
Bis (3-(2'-ethyl hexoxy) n-propyl) amine
Bis (3-octadecoxy n-propyl) amine
Bis (3-phenoxy n-propyl) amine
Bis (3-cyclohexoxy n-propyl) amine
Bis (4-phenoxy n-butyl) amine
Bis (3-(2'ethoxyethoxy) n-propyl) amine
Bis (3-(2' ethyl hexoxy) isobutyl) amine The following examples illustrate methods for the preparation of the accelerators.

Example 1

A solution in alcohol of the sodium salt of the desired dithiocarbamic acid is prepared, for example, by the slow addition with stirring of 16 g. of 50% sodium hydroxide (0.2 mol) to a cooled mixture of 38 g. of bis (3-ethoxy propyl) amine (0.2 mol), 200 cc. of ethyl alcohol and 15 g. of carbon disulfide (0.2 mol). After 15 minutes, an ethyl alcohol solution of an equimolecular proportion of one of the organic nitrogen bases in the form of a soluble salt e. g. the hydrochloride, is added to the alcohol solution of the sodium salt, the addition being accompanied by good stirring. After an additional 15 minutes, the insoluble sodium salt, e. g. the chloride, is removed by filtration. The filtrate containing the organic nitrogen base salt of the dithiocarbamic acid is evaporated under reduced pressure at a temperature below 50° C. and the resulting concentrate desiccated in a vacuum over concentrated sulfuric acid.

Any of the various organic nitrogen bases can be employed in similar manner for the preparation of the accelerators falling within the scope of the invention among which may be mentioned, for example,

| | |
|---|---|
| Methyl amine | Aniline |
| Dimethyl amine | N-ethyl aniline |
| Trimethyl amine | N-cyclohexyl aniline |
| Dibutyl amine | Toluidine |
| Cyclohexyl amine | Pyridine |
| Dicyclohexyl amine | Piperidine |
| Ethanolamine | Ditetrahydrofurfuryl amine |
| Diethanolamine | Morpholine |

The parent secondary amine salts of the dithiocarbamic acids are preferably prepared by reaction between one mol of carbon disulfide and two mols of the secondary amine, water or other suitable solvent being employed in the reaction.

EXAMPLE 2

84 grams of bis (3-ethoxy propyl) amine are dissolved in 100 cc. of water and cooled to 5° C. 17 g. of carbon disulfide are added and the mixture stirred well until clear, the temperature of the reaction mixture being kept below 25° C. The filtered product is a 50% solution of bis (3-ethoxy propyl) amine salt of bis (3-ethoxy propyl) dithiocarbamic acid which may be concentrated under reduced pressure and dried in vacuo over concentrated sulfuric acid to give the anhydrous salt which is an orange balsam.

The salts of the invention are, in general, highly active accelerators of the vulcanization of rubber and have good solubility in rubber. For the most part, they are accelerators of the ultra type and therefore suitable for the vulcanization of latex.

The activity of the compounds as accelerators for the vulcanization of rubber was tested in the following formula, parts being by weight.

| | |
|---|---|
| Smoked sheets | 100 |
| Stearic acid | 1 |
| Zinc oxide | 5 |
| Sulfur | 2.5 |
| Accelerator | 0.5 |

The samples were vulcanized in the usual manner. In the following table, A represents bis (3-methoxy propyl) ammonium bis (3-methoxy propyl) dithiocarbamate and B represents bis (3-ethoxy propyl) ammonium bis (3-ethoxy propyl) dithiocarbamate.

Table I

| Accelerator | Press cure | | Modulus at 500% | Tensile |
|---|---|---|---|---|
| | Temp. | Time | | |
| | °C. | Min. | | Lbs./sq. in. |
| A | 120 | 20 | 630 | 4,575 |
| | 105 | 30 | 355 | 3,465 |
| B | 120 | 20 | 500 | 4,235 |
| | 105 | 30 | 260 | 3,280 |

Latex test sheets were prepared from the following formula, parts being by weight,

| | |
|---|---|
| Rubber (from 60% latex) | 100 |
| Casein | 1 |
| Zinc oxide | 1 |
| Sulfur | 1.5 |
| Antioxidant | 1 |
| Wetting agent | 1 |
| Accelerator | 0.75 | and cured for 25 minutes at 100° C. in a current of hot air. In the following table of results the accelerators denoted by A and B are the same as above and C represents bis (3-isopropoxy propyl) ammonium bis (3-isopropoxy propyl) dithiocarbamate.

Table II

| Accelerator | Tensile | Elongation at break in percent |
|---|---|---|
| | Lbs./sq. in. | |
| A | 4,790 | 840 |
| B | 5,200 | 970 |
| C | 5,120 | 900 |

The accelerators of the present invention may be employed in accordance with known procedures for the vulcanization of rubber and the amounts thereof may be varied to meet individual requirements, as will be understood by those skilled in the art. The accelerators may also be used in conjunction with known accelerators where special results are desired. While, in general, the use of activators with the accelerators of the invention is not necessary, the usual activators, e. g., diphenylguanidine and di-orthotolyl guanidine, may be employed for activation of those members of the class which are of low activity.

The term "rubber" appearing in the specification and the claims is used in the generic sense and is intended to include not only natural rubbers but also sulfur-vulcanizable synthetic rubbers.

The accelerators of the present application are claimed as new chemical compounds in my copending application Serial No. 425,235 filed December 13, 1941, now Patent No. 2,302,749 dated November 24, 1942.

While I have described certain specific embodiments of my invention it is to be understood that the invention is not to be limited thereto but is to be restricted solely by the scope of the appended claims construed as broadly as is permissible in view of the prior art.

I claim:

1. A process of treating rubber which comprises vulcanizing it in the presence of an accelerator which is a dithiocarbamic acid derivative having the formula

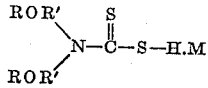

wherein R is a radical selected from the group consisting or alkyl, aralkyl, and aryl radicals, R' is an alkylene radical which separates the oxygen atom from the nitrogen atom by at least two carbon atoms, and M is an organic nitrogen base.

2. A process of treating rubber which comprises vulcanizing it in the presence of an accelerator which is a dithiocarbamic acid derivative having the formula

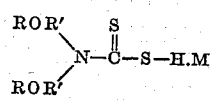

wherein R is an alkyl radical, R' is an alkylene radical which separates the oxygen atom from the nitrogen atom by at least two carbon atoms, and M is an amine.

3. A process of treating rubber which comprises vulcanizing it in the presence of an accelerator which is a dithiocarbamic acid derivative having the formula

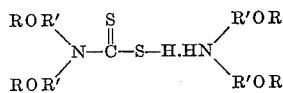

wherein R is a radical selected from the group consisting of alkyl, aralkyl, and aryl radicals and R' is an alkylene radical which separates the oxygen atom from the nitrogen atom by at least two carbon atoms.

4. A process of treating rubber which comprises vulcanizing a rubber mix containing a vulcanizing agent and bis (2-methoxy ethyl) amine salt of bis (2-methoxy ethyl) dithiocarbamic acid.

5. A process of treating rubber which comprises vulcanizing a rubber mix containing a vulcanizing agent and bis (3-methoxy propyl) amine salt of bis (3-methoxy propyl) dithiocarbamic acid.

6. A process of treating rubber which comprises vulcanizing a rubber mix containing a vulcanizing agent and bis (3-ethoxy propyl) amine salt of bis (3-ethoxy propyl) dithiocarbamic acid.

7. Rubber having incorporated therein as a vulcanization accelerator a dithiocarbamic acid derivative having the formula

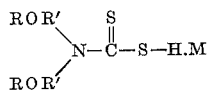

wherein R is a radical selected from the group consisting of alkyl, aralkyl, and aryl radicals, R' is an alkylene radical which separates the oxygen atom from the nitrogen atom by at least two carbon atoms, and M is an organic nitrogen base.

8. Rubber having incorporated therein as a vulcanization accelerator a dithiocarbamic acid derivative having the formula

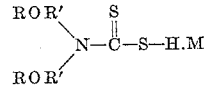

wherein R is an alkyl radical, R' is an alkylene radical which separates the oxygen atom from the nitrogen atom by at least two carbon atoms, and M is an amine.

9. Rubber having incorporated therein as a vulcanization accelerator a dithiocarbamic acid derivative having the formula

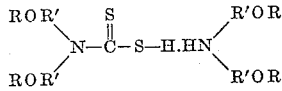

wherein R is a radical selected from the group consisting of alkyl, aralkyl, and aryl radicals and R' is an alkylene radical which separates the oxygen atom from the nitrogen atom by at least two carbon atoms.

10. Rubber containing as a vulcanization accelerator bis (3-methoxy propyl) amine salt of bis (3-methoxy propyl) dithiocarbamic acid.

11. Rubber containing as a vulcanization accelerator bis (3-ethoxy propyl) amine salt of bis (3-ethoxy propyl) dithiocarbamic acid.

12. A rubber product which has been vulcanized in the presence of a dithiocarbamic acid derivative having the formula

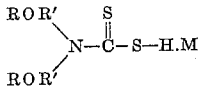

wherein R is a radical selected from the group consisting of alkyl, aralkyl, and aryl radicals, R' is an alkylene radical which separates the oxygen atom from the nitrogen atom by at least two carbon atoms, and M is an organic nitrogen base.

13. A rubber product which has been vulcanized in the presence of a dithiocarbamic acid derivative having the formula

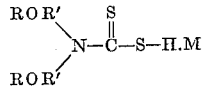

wherein R is an alkyl radical, R' is an alkylene radical which separates the oxygen atom from the nitrogen atom by at least two carbon atoms, and M is an amine.

14. A rubber product which has been vulcanized in the presence of a dithiocarbamic acid derivative having the formula

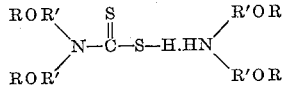

wherein R is a radical selected from the group consisting of alkyl, aralkyl, and aryl radicals and R' is an alkylene radical which separates the oxygen atom from the nitrogen atom by at least two carbon atoms.

15. A rubber product vulcanized in the presence of bis (3-methoxy propyl) amine salt of bis (3-methoxy propyl) dithiocarbamic acid.

16. A rubber product vulcanized in the presence of bis (3-ethoxy propyl) amine salt of bis (3-ethoxy propyl) dithiocarbamic acid.

17. A rubber product vulcanized in the presence of bis (2-methoxy ethyl) amine salt of bis (2-methoxy ethyl) dithiocarbamic acid.

RUSSELL T. DEAN.